(12) United States Patent
Allen et al.

(10) Patent No.: US 8,636,634 B2
(45) Date of Patent: Jan. 28, 2014

(54) REACTION AND SEPARATION PROCESSOR AND PROCESS FOR PRODUCING BIODIESEL

(75) Inventors: Mark Allen, Etlan, VA (US); Robert Miller, Madison, VA (US)

(73) Assignee: RASP Technologies, LLC, Asheville, NC (US)

( * ) Notice: Subject to any disclaimer, the term of this patent is extended or adjusted under 35 U.S.C. 154(b) by 603 days.

(21) Appl. No.: 12/593,623

(22) PCT Filed: Apr. 2, 2008

(86) PCT No.: PCT/US2008/059077
§ 371 (c)(1),
(2), (4) Date: Mar. 8, 2010

(87) PCT Pub. No.: WO2008/122026
PCT Pub. Date: Oct. 9, 2008

(65) Prior Publication Data
US 2010/0175311 A1 Jul. 15, 2010

Related U.S. Application Data

(60) Provisional application No. 60/921,340, filed on Apr. 2, 2007.

(51) Int. Cl.
*B04B 7/04* (2006.01)
*B04B 7/08* (2006.01)

(52) U.S. Cl.
USPC ........ 494/2; 494/13; 494/37; 494/60; 494/63; 494/65; 494/67

(58) Field of Classification Search
USPC ........... 494/22, 43, 46, 60, 63, 64, 65, 67, 74, 494/79, 13, 14, 37, 2
See application file for complete search history.

(56) References Cited

U.S. PATENT DOCUMENTS 2,474,006 A * 6/1949 Maycock ......................... 261/83
2,474,007 A * 6/1949 Maycock ......................... 261/83

(Continued)

FOREIGN PATENT DOCUMENTS

JP          57117357 A  *  7/1982  ............... B04B 5/06

*Primary Examiner* — Charles E Cooley
(74) *Attorney, Agent, or Firm* — Dickinson Wright PLLC

(57) ABSTRACT

Disclosed are a reaction and separation processor and a process for producing biodiesel. The processor is comprised of a stationary casing and a rotor located internal to the casing, with a gap formed between the rotor and casing. A fluid inlet port is located at the upper end of the casing for delivering fluid, which is used to produce the biodiesel, into the reaction zone of the processor, in which the reaction zone is defined as a gap between an upper portion of the rotor and casing. Surface irregularities for inducing fluid turbulence in the reaction zone are located on an inner surface of the casing, an outer surface of the rotor, or both. A rotor inlet port is located at a lower end of the rotor for directing fluid from the reaction zone into the separation zone, which is located within the rotor. A heavy phase port is at the upper end of the rotor for directing a heavy phase of the fluid, which contains glycerol produced in the process, from the separation zone to a heavy phase outlet port located at the upper end of the casing. A light phase port is at the upper end of the rotor for directing a light phase of the fluid, which contains the biodiesel produced in the process, from the separation zone through the upper shaft and to a light phase outlet port at the upper end of the casing.

16 Claims, 11 Drawing Sheets

(56) References Cited

U.S. PATENT DOCUMENTS

| | | | |
|---|---|---|---|
| 2,819,014 A * | 1/1958 | Zabriskie, Jr. | 494/22 |
| 2,969,960 A * | 1/1961 | Gurley, Jr. | 366/303 |
| 2,970,817 A * | 2/1961 | Gurley, Jr. | 366/305 |
| 3,332,614 A * | 7/1967 | Webster et al. | 494/22 |
| 3,333,828 A * | 8/1967 | Boehme | 366/305 |
| 3,471,131 A * | 10/1969 | Fritzweiler et al. | 366/305 |
| 3,674,196 A * | 7/1972 | Gutter | 494/60 |
| 3,718,259 A | 2/1973 | Harrison | |
| 3,996,012 A | 12/1976 | Zucker | |
| 4,684,614 A * | 8/1987 | Krovak et al. | 435/295.1 |
| 4,786,480 A * | 11/1988 | Martin | 422/259 |
| 4,824,430 A * | 4/1989 | Kashihara et al. | 494/22 |
| 4,846,780 A * | 7/1989 | Galloway et al. | 494/3 |
| 4,857,040 A * | 8/1989 | Kashihara et al. | 494/22 |
| 4,867,878 A * | 9/1989 | Rashev | 210/363 |
| 4,925,441 A * | 5/1990 | Jubin | 494/32 |
| 4,959,158 A * | 9/1990 | Meikrantz | 210/787 |
| 5,024,647 A * | 6/1991 | Jubin et al. | 494/37 |
| 5,141,328 A * | 8/1992 | Dilley | 366/305 |
| 5,254,075 A * | 10/1993 | Nemoto et al. | 494/35 |
| 5,254,076 A * | 10/1993 | Chow et al. | 494/37 |
| 5,267,936 A * | 12/1993 | Miachon | 494/22 |
| 5,295,798 A * | 3/1994 | Maruyama et al. | 418/201.1 |
| 5,484,383 A * | 1/1996 | Fitch et al. | 494/48 |
| 5,571,070 A * | 11/1996 | Meikrantz et al. | 494/22 |
| 5,591,340 A * | 1/1997 | Meikrantz et al. | 210/512.3 |
| 5,624,371 A * | 4/1997 | Mohn | 494/60 |
| 5,762,800 A * | 6/1998 | Meikrantz et al. | 210/512.3 |
| 5,908,376 A * | 6/1999 | Macaluso et al. | 494/29 |
| 5,968,355 A * | 10/1999 | Lee et al. | 210/321.68 |
| 6,102,843 A * | 8/2000 | Kelley et al. | 494/29 |
| 6,203,483 B1 * | 3/2001 | Birdwell et al. | 494/22 |
| 6,238,329 B1 * | 5/2001 | Rogers | 494/22 |
| 6,379,293 B1 * | 4/2002 | Kim et al. | 494/56 |
| 6,440,054 B1 * | 8/2002 | Galik | 494/22 |
| 6,627,784 B2 | 9/2003 | Hudson | |
| 6,699,169 B2 * | 3/2004 | Ogino et al. | 494/22 |
| 6,974,305 B2 | 12/2005 | Garrett, III | |
| 6,976,947 B2 * | 12/2005 | Ogino et al. | 494/22 |
| 7,134,991 B2 * | 11/2006 | Rivalier et al. | 494/22 |
| 7,144,361 B2 * | 12/2006 | Aizawa et al. | 494/38 |
| 7,150,836 B2 * | 12/2006 | Meikrantz | 210/748.07 |
| 7,635,328 B2 * | 12/2009 | Hinman et al. | 494/37 |
| 7,678,039 B2 * | 3/2010 | Åström | 494/37 |
| 7,794,383 B2 * | 9/2010 | Tetsu et al. | 494/7 |
| 7,806,584 B2 * | 10/2010 | Wootan et al. | 366/170.3 |
| 7,837,609 B2 * | 11/2010 | Merino et al. | 494/60 |
| 7,862,494 B2 * | 1/2011 | Merino et al. | 494/60 |
| 7,874,973 B2 * | 1/2011 | Akatsu et al. | 494/14 |
| 7,909,751 B2 * | 3/2011 | Tobita et al. | 494/37 |
| 8,038,592 B2 * | 10/2011 | Toi et al. | 494/2 |
| 8,097,219 B2 * | 1/2012 | Birdwell et al. | 422/209 |
| 2003/0114289 A1 * | 6/2003 | Merino et al. | 494/37 |
| 2004/0023779 A1 | 2/2004 | Ogino et al. | 494/22 |
| 2004/0214711 A1 * | 10/2004 | Aizawa et al. | 494/79 |
| 2005/0003944 A1 * | 1/2005 | Rivalier et al. | 494/22 |
| 2005/0054507 A1 | 3/2005 | Cornay | |
| 2005/0075509 A1 | 4/2005 | Luxem | |
| 2005/0176571 A1 * | 8/2005 | Merino et al. | 494/37 |
| 2005/0215410 A1 * | 9/2005 | Merino et al. | 494/37 |
| 2006/0009341 A1 * | 1/2006 | Tobita et al. | 494/14 |
| 2006/0011563 A1 * | 1/2006 | Meikrantz | 210/787 |
| 2006/0258524 A1 * | 11/2006 | Merino et al. | 494/67 |
| 2007/0055073 A1 | 3/2007 | McGurk | |
| 2008/0300124 A1 * | 12/2008 | Akatsu et al. | 494/14 |
| 2009/0239729 A1 * | 9/2009 | Tobita et al. | 494/14 |
| 2010/0041536 A9 * | 2/2010 | Merino et al. | 494/37 |
| 2010/0075823 A1 * | 3/2010 | Toi et al. | 494/6 |

\* cited by examiner

REACTION AND SEPARATION PROCESSOR AND PROCESS FOR PRODUCING BIODIESEL

CROSS-REFERENCES TO RELATED APPLICATIONS

This application claims priority to, and incorporates by reference herein in its entirety, U.S. Provisional Patent Application 60/921,340, filed 2 Apr. 2007.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
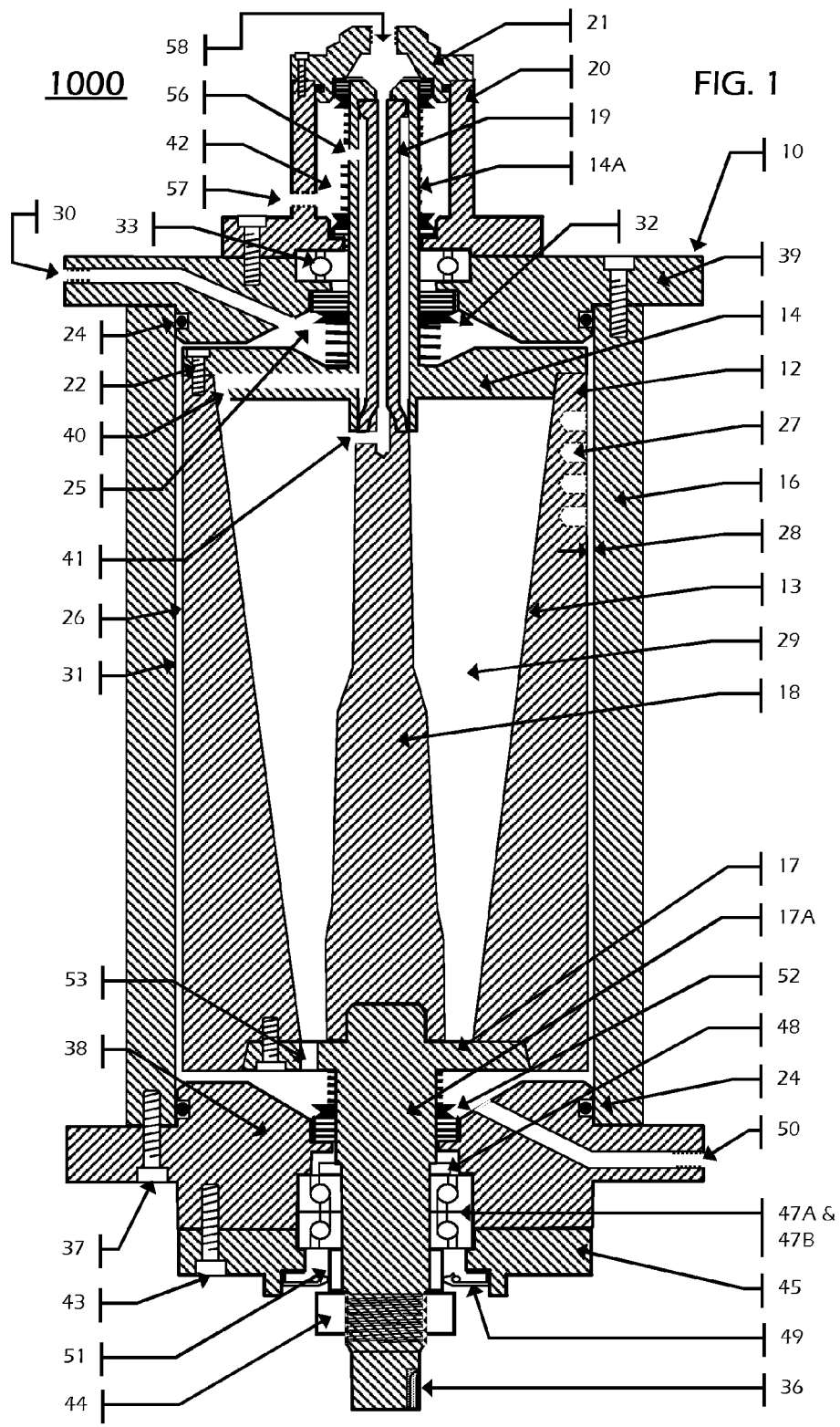
FIG. 1 is a cross-sectional view of exemplary embodiment 1000 of a machine taken at section line 1-1 of FIG. 8.

Certain exemplary embodiments can provide a device and/or machine that can include a stationary casing and/or a cylindrical rotor located substantially within the stationary casing, the rotor defining a longitudinal axis, the rotor adapted to rotate about the longitudinal axis, the machine defining a reaction zone within the machine and a separation zone within the machine, the reaction zone fluidly coupled to the separation zone.

Certain exemplary embodiments can provide a cylindrical drum (rotor) that rotates about its longitudinal axis inside a stationary casing. The rotor can be driven by any means, such as an electric motor. The inner surface of the casing and/or outer surface of the rotor can be smooth and/or possess surface irregularities such as serrations, dimples, and/or bore holes. Depending on the size, orientation, number, frequency, and/or shape of these protrusions and/or indentations and/or their proximity to the outer casing wall, variations in the speed of rotation can create, in the reaction zone, different degrees of shear forces and/or turbulence, and/or can induce cavitation. It is in this space (the reaction zone) that various combinations of fluids, gases, and/or solids can, as needed, be present and/or injected to perform chemical reactions, dispersion of a gas in a fluid, and/or mass transfer to form new products or process known products in a novel way.

Thus, shear forces, turbulence, and/or cavitation can be induced into a fluid and/or gas/fluid combination by the physical configuration of the device. These forces can be used as a source of energy to break down van der Waals attractions in the fluids, cause very fine dispersions of gas in liquids, etc., thereby causing mixing and/or the emulsification of two dissimilar fluids on a molecular level, uniform distribution of one fluid or gas throughout another, heating of the fluids present, and/or a reaction in and/or between those fluids.

After passing through the reaction zone, the product or products can then be directed through porting to the center of the rotor, which can be hollow and/or have additional components present as needed for the process and/or can function as a centrifuge. It is this space in the center of the rotor, which the drawings refer to the "separation zone", that can be fitted with stator vanes to resist, prevent, and/or halt the inherent spiral motion of the product and/or to accelerate separation due to the various components' differences in specific gravity. As the byproducts of the reaction are separated, they then pass through machined porting and/or a system of rotating seals to individually exit the machine. Control of the location of the phase separation, pressure, and/or ratio of flow of fluids inside the machine can be accomplished via pressure regulating and/or flow control valves located inside and/or outside of the machine.

In certain exemplary embodiments, the machine can function as a Reaction And Separation Processor, and thus is sometimes referred to herein as a RASP.

Via certain exemplary embodiments, by providing the reaction and separation functions via a single shaft rotating within a single machine, and/or by having only a relatively thin metal partition dividing the zones, heat can be easily transferred between the reaction zone and the separation zone, thereby helping maintain desired temperatures in each zone and/or allowing one zone to act as a heat sink for the other. In certain exemplary embodiments, via locating the separation zone immediately adjacent the reaction zone, the products can be immediately separated upon exit from the reaction zone, thereby substantially minimizing the risk of recombination.

In certain exemplary embodiments:
- a single pass through the RASP can substantially complete the reaction and/or separation of the byproducts;
- the entire process through the RASP can be pressurized;
- control of the separation process can be internal and/or external, such as via pressure and/or flow regulating valves, thereby allowing adjustments to be made while running;
- numerous variables can be controlled while running to accommodate different requirements for different reactions (e.g., rotational speed, temperature, throughput rates, residence time, pressure, etc.); etc.
- the RASP can be manufactured by those skilled in the art and does not involve special tooling or high cost, specialty machinery, to manufacture;
- the RASP can be built from various materials of construction such as stainless steel, carbon steel, aluminum, titanium, etc., to permit the use of the RASP in various processes and/or reactions as specifically required by that process and/or reaction.

Certain exemplary embodiments can provide:
- continuous production process;
- consistent and/or continuously verifiable output quality;
- efficiency, e.g., lower energy requirement vs. throughput;
- versatility, e.g., more applications by design and scalability;
- ease of operation and/or field serviceability;
- reduction in ancillary equipment costs;
- an ability to be oriented at any angle and/or inclination;

an ability to operate on a moving platform, such as aboard a ship, aircraft, and/or spacecraft;

an ability to work in zero gravity;

an ability to be retrofitted to existing plants as a cost-effective upgrade; and/or low maintenance requirements and/or low unit cost; etc.

Certain exemplary embodiments can provide continuous production process vs. batch, yielding consistency of product quality. In certain exemplary embodiments, a single pass through the RASP can complete the reaction and/or separation of the byproducts. Via certain exemplary embodiments, the entire process through the RASP can be pressurized. Certain exemplary embodiments can be adaptable to accommodate different mass transfer reactions and/or processes. Thus, one design can be slightly varied to accomplish different reactions and/or separations.

Certain exemplary embodiments can be scaled up to process any quantity of material that is practical. In addition, multiple units can operate in parallel and/or series as desired. The low cost to manufacture certain exemplary embodiments and/or the simplicity of certain exemplary embodiments, increases their attractiveness for facilitating the production of even marginally profitable products.

Certain exemplary embodiments can provide a unit that is relatively small and/or compact for its processing capability. In certain exemplary embodiments, only a small amount of reactants reside in the unit at any one time, which can make servicing the unit relatively quick and easy. Also, the relatively small amount of material exposed to processing conditions at any one time can make process upsets easy to recover from and/or minimizes the potential loss of valuable product.

Certain exemplary embodiments can be relatively quick and easy to startup and/or shutdown. Often, a RASP start-up to steady state can be accomplished in under ten minutes and a shutdown of the system can be immediate without loss of product quality. Because certain exemplary embodiments of the RASP can be operated above atmospheric pressure and/or certain exemplary embodiments can generate their own centripetal force, they can be used in situations and/or environments that have varying degrees of gravitational pull, lateral movement, and/or atmospheric pressure, such as aboard a ship or in outer space.

Certain exemplary embodiments can be utilized to produce biodiesel. In that process, high shear forces and cavitation induced in the fluid can act to emulsify the triglycerides and/or the alcohol in the reaction zone of the RASP. The fluids can be mixed violently and/or heated. These conditions can allow the reaction to be completed in a relatively short period of time. An exemplary block flow diagram for an exemplary biodiesel process 10000 utilizing an exemplary embodiment of a RASP is provided in FIG. 10.

Figure 10:
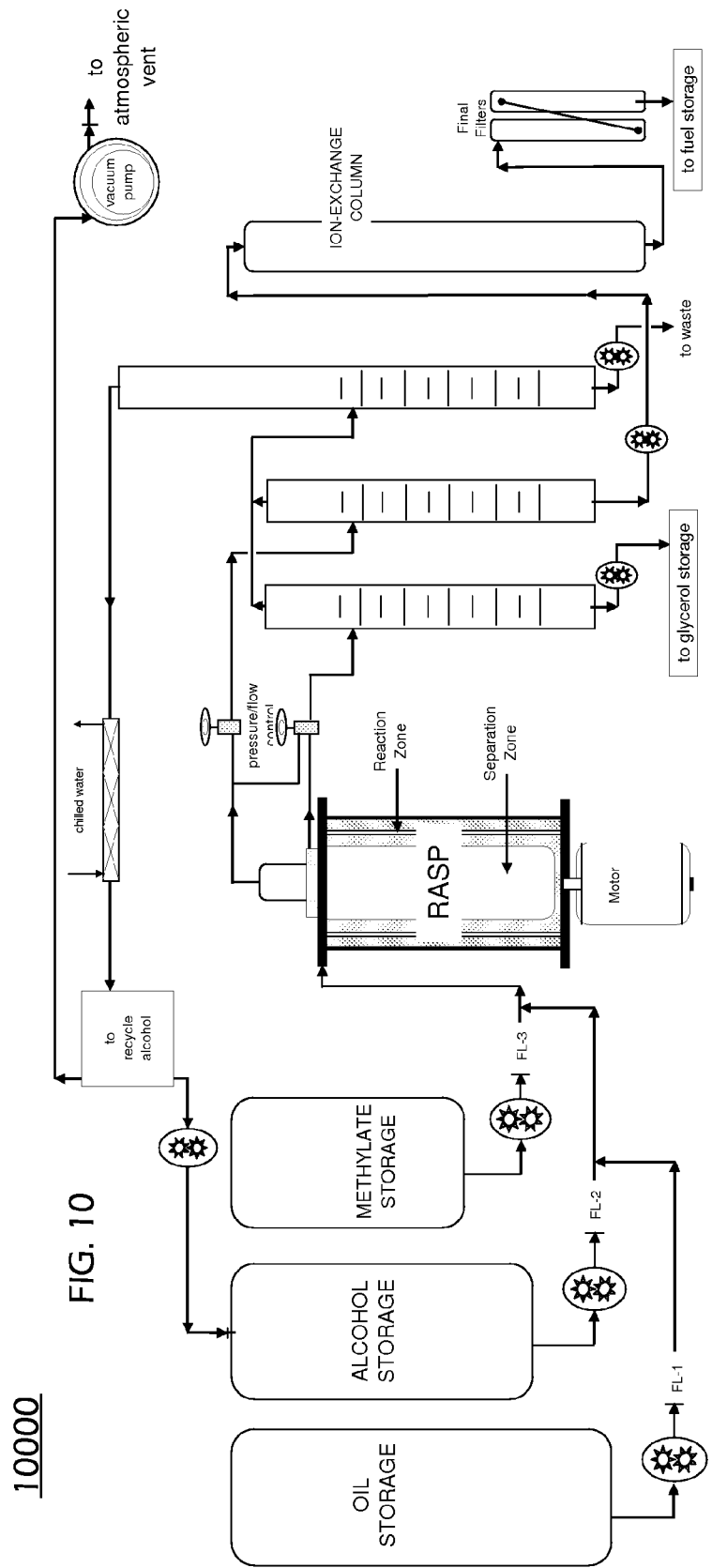
FIG. 10 is an exemplary block flow diagram for an exemplary biodiesel process 10000.

Referring to FIG. 10, the alcohol and oil can be immiscible. Mixing can bring the reactants together, but in addition to the mixing, the shear and/or cavitation can impart energy in the form of heat to the fluid, thereby reducing the viscosity of the fluids and/or imparting a higher state of activity to the reactants. The reaction can proceed at a faster rate the higher the temperature/pressure. At atmospheric pressure, the upper limit for the temperature is the boiling point of the alcohol, approximately 60 deg. C. for methanol. We can pressurize the RASP to allow us to operate above atmospheric pressure, such as between approximately 0 psig and approximately 100 psig, including all values therebetween, such as approximately 5, 15, 21.9, 38, 45, 57.32, 72 and/or 84 psig, and all subranges therebetween, along with a temperature just below that corresponding to the boiling point of alcohol at that pressure. By suppressing the alcohol from vaporizing, it can remain available to facilitate the transesterification reaction. Additionally, any undesirable boiling and/or vaporizing of the alcohol in the separation zone can cause turbulence, thereby potentially disrupting a clean phase separation of the exiting fluids.

The temperature can be a function of the design of the rotor/casing cavity, the speed of rotation, and/or the flow rate of reactants. In the case of the rotor/casing; a very tight fit (e.g., approximately 10 to 20 thousandths of an inch) between the stationary wall and the rotor wall can cause high shear in a viscous fluid, increase the HP input required, and/or ultimately raise the BTUs delivered into the fluid. The number and/or dimension of bore holes on the surface of the rotor can affect the energy delivered into the fluids as well. We have successfully used a reaction zone cavity dimension of approximately 100 thousandths and approximately ½ inch wide by approximately ½ inch deep bore holes at a leading angle of approximately 4 degrees off axis.

Rotational speed can affect the rate of heating and/or the resulting reaction of the fluids. A relatively small change in speed can result in a disproportionate change in temperature. We are currently working with rotational speeds between approximately 1725 and approximately 5000 RPM, including all values and subranges therebetween.

Flow rate can affect the temperature by robbing the RASP of heat and/or carrying it away in the products of the reaction. Heat can be added and/or removed as needed for the particular reaction and/or process by a heat exchanger fitted to the outside surface of the casing and/or incorporated into the casing itself.

Residence time can be a function of the total internal void of the RASP and/or the volume delivered to the RASP reaction zone over time. In the above-illustrated exemplary biodiesel reaction, the total internal void is approximately 2500 ml. At the moment we are operating with a residence time of approximately 1.5 minutes.

To begin the biodiesel process, the RASP can be preheated by rotating it at approximately 3450 RPM for approximately 8 minutes with no throughput of reactants. During heat-up, the RASP can be filled with reactants to wet the mechanical seals, but typically has no product or byproduct output until it achieves approximately 72 Deg. C. Then the pumps can begin delivering a ratio of approximately 4:1 room temperature, using low free fatty acid or virgin vegetable oil and pre-blended methoxide at approximately 1500 ml/minute through the RASP at approximately 45 PSI. The RASP can be rotated at approximately 3450 RPM by direct drive electric motor. The exiting fluids, fatty acid methyl ester (FAME) and glycerol (unrefined glycerin), can be directed to their respective flash evaporation column at between approximately 45 and approximately 85 PSIG and approximately 75 to approximately 85 degrees C. The flash columns can be operated at a vacuum of approximately 12 inches mercury and can be composed of disk-and-donut plates arranged vertically. The fluids can enter near the top of the column and then can cascade down the column, spilling from plate to plate. On entering the flash column, the latent heat carried in the fluids from the RASP can vaporize the alcohol. The vaporized alcohol can continue to a rectifying column where it can be refined further to approximately 100 percent methanol by removing any trace water. The anhydrous alcohol then can be pumped to the alcohol storage tank for recycling into the process. The fuel and/or glycerol can be pumped from the bottom of their respective columns. The glycerol can go to storage and/or the fuel can continue on to pass through a set of ion-exchange resin columns. From the ion-exchange columns, the finished fuel can be pumped to storage.

Still referring to FIG. 10, pumps 1, 2, and/or 3 can be controlled by a computer using a closed loop to deliver the desired proportional amounts of reactants, vegetable oil, methanol, and/or potassium methylate (catalyst) respectively, directly to the RASP through flow meters 1, 2, and/or 3. Pumps 1, 2, and/or 3 can control the residence time in the reactor and/or deliver the exact amount of reactants for the desired reaction. Reactants can immediately enter the RASP reaction zone where the shear and/or cavitation forming forces induced by the configuration of the casing and/or rotor can cause the mass transfer reaction. The fluids then can enter the separation zone of the RASP and/or can be separated into a heavy and/or a light phase before exiting the RASP. Pressure and/or flow control through the RASP can be controlled with pumps 1, 2, and/or 3 and/or pressure and/or flow control valves.

The products of the reaction can be treated in a manner appropriate for the process being performed. In the case of biodiesel production, which is used here as an example, the product fuel (fatty acid methyl ester or FAME) and/or the byproduct glycerol can be stripped of excess alcohol in the two columns. The alcohol can be further rectified and returned to the alcohol storage tank for reuse in the process.

After the glycerol has the alcohol stripped from it, it can be pumped to a storage tank for further refining. In our example, the fuel can continue from the stripping column to an ion-exchange column where any impurities in the final fuel can be removed. The refining of the fuel can be performed by various means known to those skilled in the art, such as water washing followed by drying, treatment with magnesium silicate followed by filtering, and/or, as here illustrated, treatment with ion-exchange resin, etc., depending on the operator's choice. After the fuel is determined to be free of containments, it can be transferred to storage where it can be drawn from for powering a standard diesel engine.

We have had two independent ASTM tests performed on fuel produced via an embodiment of this process having a slightly different configuration to what we are using today. The first test results show the fuel passing all required parameters. See Table A below. The only parameter to barely pass in this test was the cetane level. The second test barely failed one requirement but the lab reported that the sample was smaller than necessary to get confirmation of this parameter because the sample container arrived broken due to rough handling in transit. In fact, unknown to the lab we had shipped the same fuel as submitted in the earlier sample for the second sample four days later as the first sample. After researching why the fuel we had sent in the first sample only met the minimum specification for cetane under the ASTM 6751 standard, we had a theory that is was due only to the "freshness" of the fuel, i.e., the fuel had not had any time to oxidize. We had filled and sealed the fuel in a glass container the moment it was made. Research shows that slight oxidation can tend to increase cetane level. Indeed, after simply bubbling air through a sample for approximately 24 hours from the same batch as the first, the ASTM test came back with a higher cetane number.

There are crude but reliable tests we routinely perform in our lab that indicate the fuel produced in our system will meet the ASTM 6751 specifications. The ASTM test effectively serves as confirmation that the process parameters were followed without upset.

TABLE A

Continuous Flow RASP ASTM D 6751 Test Results

| TEST | RESULT | LIMITS | UNITS |
|---|---|---|---|
| Flash point | 499 | 130 and up | degrees C. |
| Water and Sediment | <0.050 | 0.050 or less | % volume |
| Viscosity | 4.143 | 1.9-6.0 | mm2/s |
| Ash | 0.002 | 0.020 max | wt. % |
| Total Sulfur | 0.0000023 | 0.05 max | wt. % |
| Copper Corrosion | 1a | #3 max | n/a |
| Cetane number | 47 | 47 min | n/a |
| Carbon Residue | <0.05 | 0.050 max | wt. % |
| Acid number | 0.481 | 0.8 max | mg KOH/g |
| Free Glycerin | 0.015 | 0.020 max | wt. % |
| Total Glycerin | 0.220 | 0.240 max | wt. % |
| Phosphorous | <0.0010 | 0.001 max | wt. % |
| Distillation Temp | 356 | 360 max | degrees C. |

An exemplary embodiment of the RASP, similar to that shown in the following figures, was constructed as follows:
- aluminum casing, rotor, and end bearing plates;
- a machine lathe and a vertical mill, both manual, not CNC, used according to ordinary skill known to those familiar in the art to machine the casing, rotor, end hubs, and end plates;
- steel rotor end hubs and shafts;
- bearings: off the shelf;
- upper bearing: SKF Angular Contact Bearing 35 mm shaft part no. 7207BEP;
- lower bearing: SKF Angular Contact Bearing 25 mm shaft part no. 7205BEP;
- mechanical seals: off the shelf;
- lower bearing seal: Chicago Rawhide available thru NAPA part no. 13948;
- upper rotating seal: Pac-Seal brand thru McMaster Carr part no. 177V9281K76;
- lower rotating seal: Pac-Seal brand thru McMaster Carr part no. 168V9281K66; and
- O-rings, off the shelf; Viton Dash No. 260.

Potential Modifications to the RASP

The catalyst for a particular reaction and/or process to be carried out in the RASP can be made integral to the structure of the device itself. That is, the catalyst can be formed and/or made a part of the rotor and/or the casing. Likewise, the catalyst can be added as a filling into a cavity and/or gap located within and/or between the casing and the rotor. The presence of a matrix of material such as stainless mesh and/or wool and/or other material, and/or the catalyst itself as mentioned above, in the separation zone can facilitate coalescing of the byproducts from the reaction and/or make separation possible and/or more complete.

To accommodate the processing of various fluids and/or gas/fluid combinations, heat can be added to the RASP and/or removed from the RASP as needed for the particular reaction and/or process. This can be accomplished by a heat exchanger fitted to the outside surface of the casing and/or incorporated into the casing itself.

A slip ring assembly can be added to the top of the rotor assembly, which can permit sensors internal to the RASP rotor to communicate via wire with control and/or monitoring equipment external to the RASP. Having the ability to monitor conditions inside the RASP can afford the designer and/or operator of a process using the RASP to better understand the process parameters, control product quality, and/or collect important data for storage and/or later analysis.

A port for inserting a fiber optic cable and/or other such measuring/monitoring device into the axis of the rotor can be provided. Instruments that analyze transmitted/reflected near-infrared light have been found useful for process monitoring, analysis, and/or control. These instruments can use near-infrared light directed through fiber optical cable to a probe tip to detect the presence of, and/or concentration of, products.

The RASP also can be built with a transparent window and/or casing thereby allowing it to be used for:
- research into turbulent mixing;
- research into cavitation in fluids; and/or
- a reaction and/or process acted upon by a light source external to the RASP but which is passed through the casing of the RASP. Such a reaction and/or process can use infrared and/or ultraviolet light to cause a reaction and/or to sterilize products.

Certain exemplary embodiments can function as a centrifugal contactor for mixing and/or separating dissimilar and/or immiscible fluids. Certain exemplary embodiments of the RASP can provide a mixing region for mixing and/or extracting two immiscible liquids and/or a centrifugal separating zone for separating the liquid-liquid dispersion into two phases. Such a contactor can be used in a wide variety of applications, including washing, separating, and/or organics, food oils, flavors and/or essential oils; separating viruses and/or cultured microbes for vaccines and/or medicines; oil/water separations; waste water management; cell wall disruption and/or extraction of soluble components; and/or liquid-liquid extractions.

Certain exemplary embodiments provide a rotor with a 5 degree sloped inner wall. This slope can propel material with any appreciable mass towards the outlet port thereby preventing it from adhering to the wall. In the case of processing very difficult materials (i.e., sticky, low mass) the interior wall of the rotor can be coated with a layer of anti-stick material such as Teflon and/or PTFE as may be appropriate.

Figure 2:
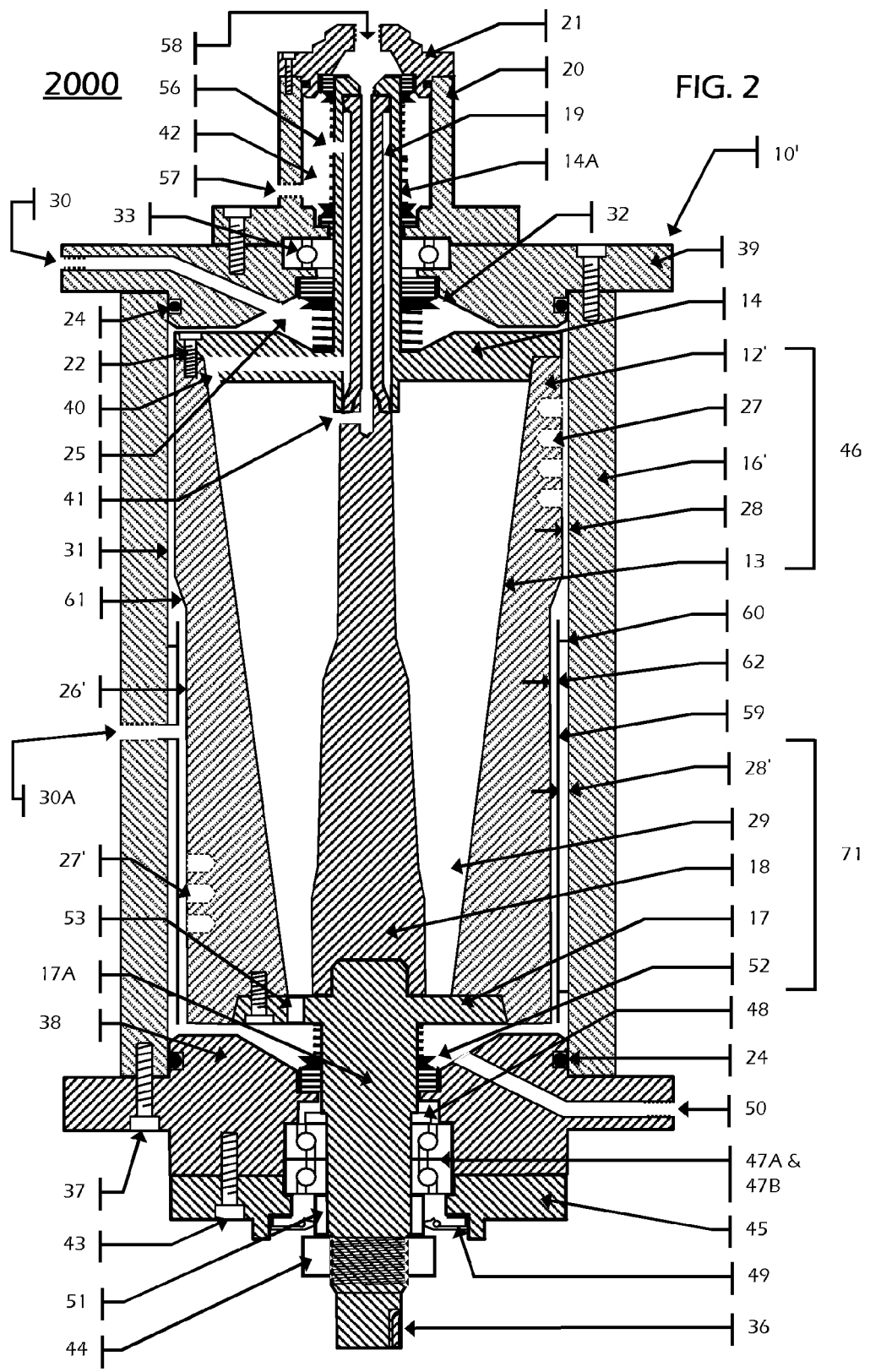
FIG. 2 is a cross-sectional view of exemplary embodiment 2000 of a machine taken at section line 2-2 of FIG. 8.
Figure 8:
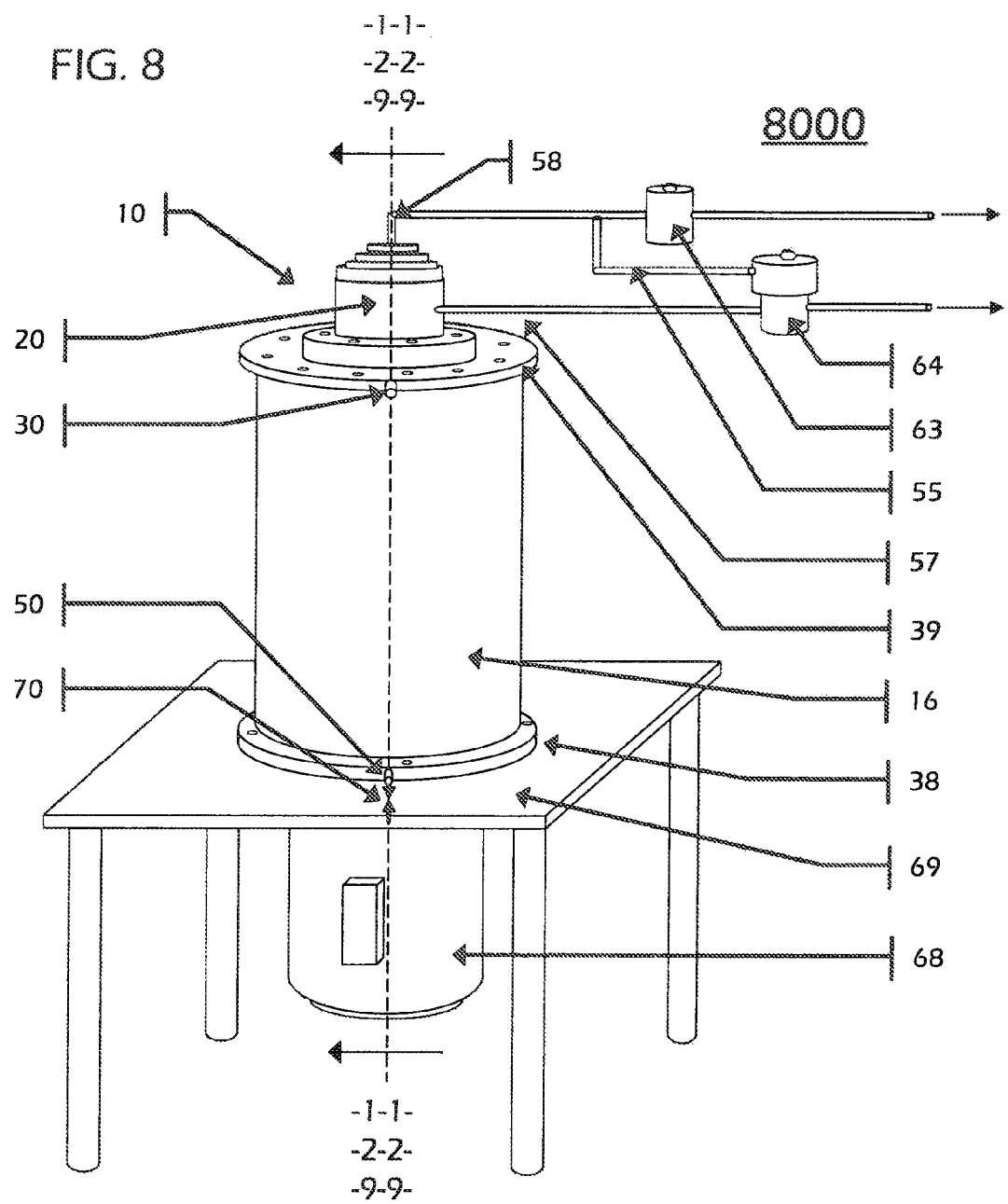
FIG. 8 shows in perspective view an exemplary embodiment of a system 8000.

FIG. 1 is a cross-sectional view of an exemplary embodiment 1000 of a reactor-separator machine 10 taken at section line 1-1 of FIG. 8. FIG. 2 is a cross-sectional view of an exemplary embodiment 2000 of a reactor-separator machine 10' taken at section line 2-2 of FIG. 8. In FIG. 2, elements that are substantially the same as in FIG. 1 carry the same identifying numerals. Elements that are slightly changed but can serve the same functions carry primed numerals while some elements are new and carry new numerals.

As shown in FIG. 1, the machine and/or device 10 can include a rotor 12 mounted on a set of hubs 14 & 17 containing integral shafts 14A & 17A respectively, which rotor 12, hubs 14 & 17, and shafts 14A & 17A can rotate within a casing 16. The casing 16 can define a centrally-disposed opening configured to receive the rotor 12 in such a manner as to allow for the unencumbered rotation of the rotor 12 within the casing 16. A gap known as the reaction or contact zone 28 can be defined between the inner surface 32 of the casing 16 and the outer rotor surface 26 of rotor 12 to allow for the flow of a selected fluid or multiple fluids for accomplishing a selected process. Such fluids and processes can include:
- heating a fluid and/or fluids;
- heating a fluid and/or fluids for constituent separation and/or recovery of one or more of constituents;
- reacting and processing of chemicals;
- washing and/or contacting fluids for purification and/or extraction; and/or
- homogenization and/or emulsification of fluids.

Figure 5:
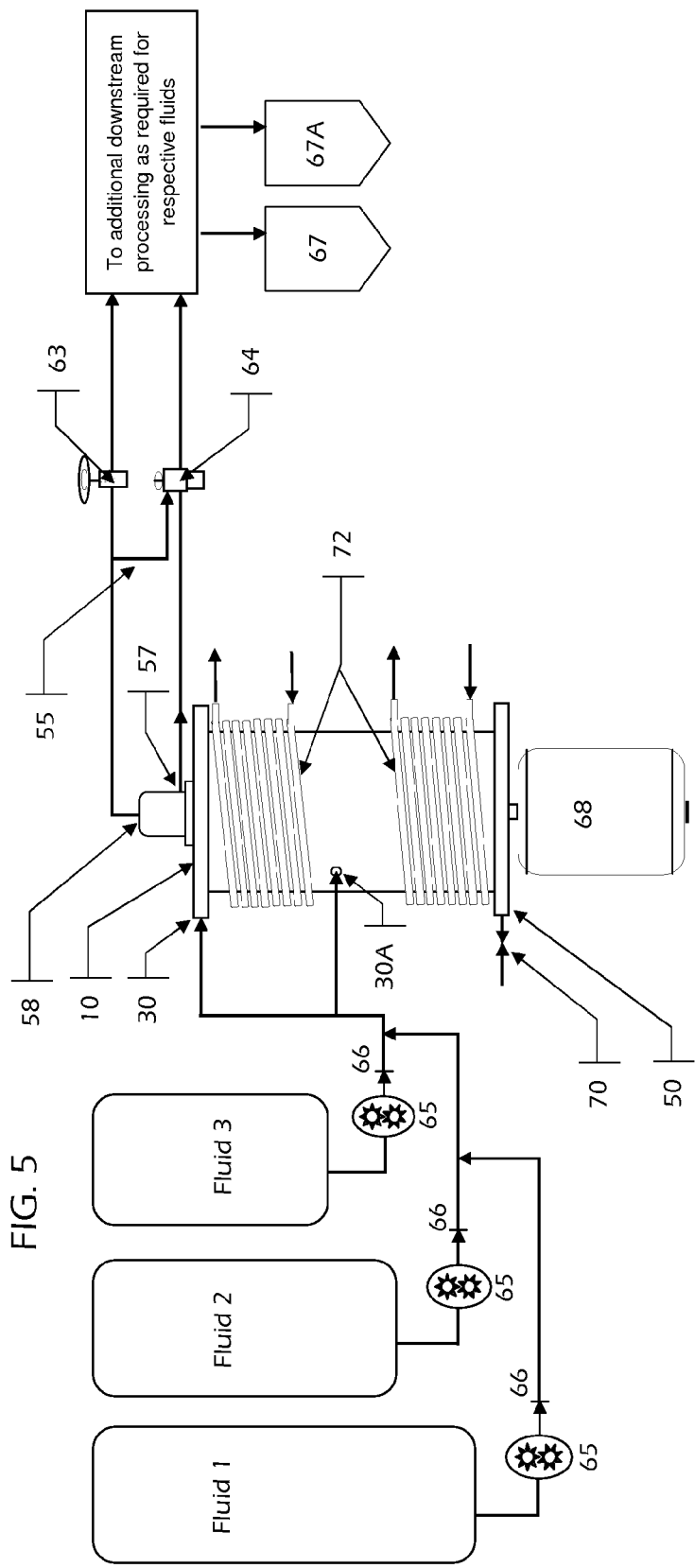
FIG. 5 is a schematic view of an exemplary embodiment of a system 5000.

Rotor 12 can be supplied with an inlet port 53 that can allow the fluids from the reaction/contact zone 28 to pass into the separation zone 29 where, by centrifugal forces developed from the rotation of rotor 12, the products or by products of the reaction and/or contacting process can be separated as a function of their differing densities. The respective fluids can exit the separation zone through an arrangement of ports and seals located in the upper section of the device 10 and/or can be conducted away for further processing as may be desired. A representative schematic view of the machine 10 functioning in a system for reacting and separating fluids is shown in FIG. 5.

As shown in FIGS. 1 and 2, the machine 10 can include a rotor 12 mounted on a set of shaft hubs 14 & 17, which rotor 12 and shafts 14A & 17A can rotate within a casing 16. In certain exemplary embodiments, the shaft 14A of the shaft & hub 14 can have a primary outside diameter of approximately 1.25 inches to approximately 3 inches, including all values and subranges therebetween, such as approximately 1.625 inches, and can be formed of forged steel or other suitable shaft materials as desired. In certain exemplary embodiments, the shaft 17A of the shaft & hub 17 can have a primary outside diameter of approximately 0.875 inches to approximately 2.5 inches, including all value and subranges therebetween, such as approximately 1.500 inches, and can be formed of forged steel or other suitable shaft materials as desired. Shaft 17A can contain keyway 36 and/or can be driven by an electric motor (not shown) or other motive means, and/or can be driven directly or with gears, driven by pulley, and/or driven as otherwise desired.

Rotor 12 can be fixedly attached to shaft hubs 14 & 17 using cap screws or other fasteners 22, and/or can be formed of aluminum, steel, iron, and/or other metal and/or alloy as appropriate. Rotor 12 can be a hollow cylinder with an inner wall 13 that is tapered approximately 3 degrees to approximately 7 degrees, including all values and subranges therebetween, such as approximately 5 degrees, and/or can feature a recess at each end to receive shaft hubs 14 & 17, that recess tapered approximately 3 degrees to approximately 10 degrees, including all values and subranges therebetween, such as approximately 5 degrees. A number of irregularities 27 can be formed in and/or upon the rotor's cylindrical surface as is required for the desired effect. In certain exemplary embodiments, the rotor 12 can be approximately 4 inches to approximately 20 inches in diameter, including all values and subranges therebetween, such as approximately 6.4 inches, and/or approximately 6 inches to approximately 36 inches in length, including all values and subranges therebetween, such as approximately 14.5 inches. Rotor 12 can feature a plurality of regularly spaced and/or aligned recesses or bores 27 drilled, bored, or otherwise formed in its cylindrical surface 26. Bores 27 can feature countersunk bottoms, as shown in FIGS. 1 and 2. The longitudinal axis of each recess 27 can be offset and/or angled with respect to a radius of rotor 12. In certain exemplary embodiments, recesses 27 can be angled approximately 0 degrees to approximately 12 degrees including all values and subranges therebetween, such as approximately 4 degrees with respect to a radius of the rotor 12. In certain exemplary embodiments, recesses 27 can face into the direction of rotation of rotor 12 or away from the direction of rotation as may be required for the process. The depth, diameter, and/or orientation of recesses 27 can be adjusted to optimize efficiency and/or effectiveness of device 10 for heating and/or reacting various fluids, and/or to optimize operation, efficiency, and/or effectiveness of device 10 with respect to particular process conditions, such as fluid temperatures, pressures, and/or flow rates, potentially as they relate to rotational speed of rotor 12. In certain exemplary embodiments, the recesses 27 can be distributed radially at intervals of approximately 12 degrees to approximately 45 degrees, including all values and subranges therebetween, such as approximately 15 degrees apart from one another and/or can have a depth greater than their diameter.

Casing 16 can be essentially a hollow cylinder whose interior surface 31 can conform closely to the cylindrical surface 26 of rotor 12. Certain exemplary embodiments of device 10 can feature a clearance measuring approximately 0.010 inches to approximately 0.5 inches, including all values and subranges therebetween, such as approximately 0.100 inch clearance 28 between rotor 12 and casing 16 in the radial direction. Smaller or larger clearances can be provided depending, for example, upon the parameters of the fluid involved, the process conditions required, the desired flow rate, and/or the rotational speed of rotor 12. Casing 16 can be formed of aluminum, stainless steel, and/or otherwise as desired, and/or may feature a plurality of axially disposed cap screws and/or other fasteners 37 can connect casing 16 in a sealing relationship with casing cap plates 38 and 39. The edges of these casing caps can be provided with O-rings and/or the equivalent type of seal 24 in the lower casing cap 38 and/or the upper casing cap 39.

The interior surface 31 of casing 16 can be smooth, as shown, with no irregularities, can be serrated, and/or can feature protrusions, holes, bores, and/or other irregularities as desired to, for example, increase the efficiency and/or effectiveness of device 10 for particular fluids and/or process conditions, flow rates, and/or rotor 12 rotational speeds.

Fastened with cap screws 43 to the lower casing cap 38 can be a lower bearing cap 45. Functions of bearing cap 45 can be to carry angular contact bearings 47A and/or 47B, which in turn can carry lower shaft 17A, and/or to carry an oil seal 49 that can contact a bearing bushing 51 that can be carried by shaft 17A. Bearing land 48 can distribute the pressure developed in locking the bearings with nut 44 evenly across the inner race of the angular contact bearings. Mechanical seal 52 can prevent and/or minimize leakage of fluid adjacent to shaft 17A from the device. Mechanical seal 52 can be a spring-loaded seal and/or can be formed of tungsten carbide and/or other suitable material. Other seals and/or O-rings may be used as required.

Figure 3:
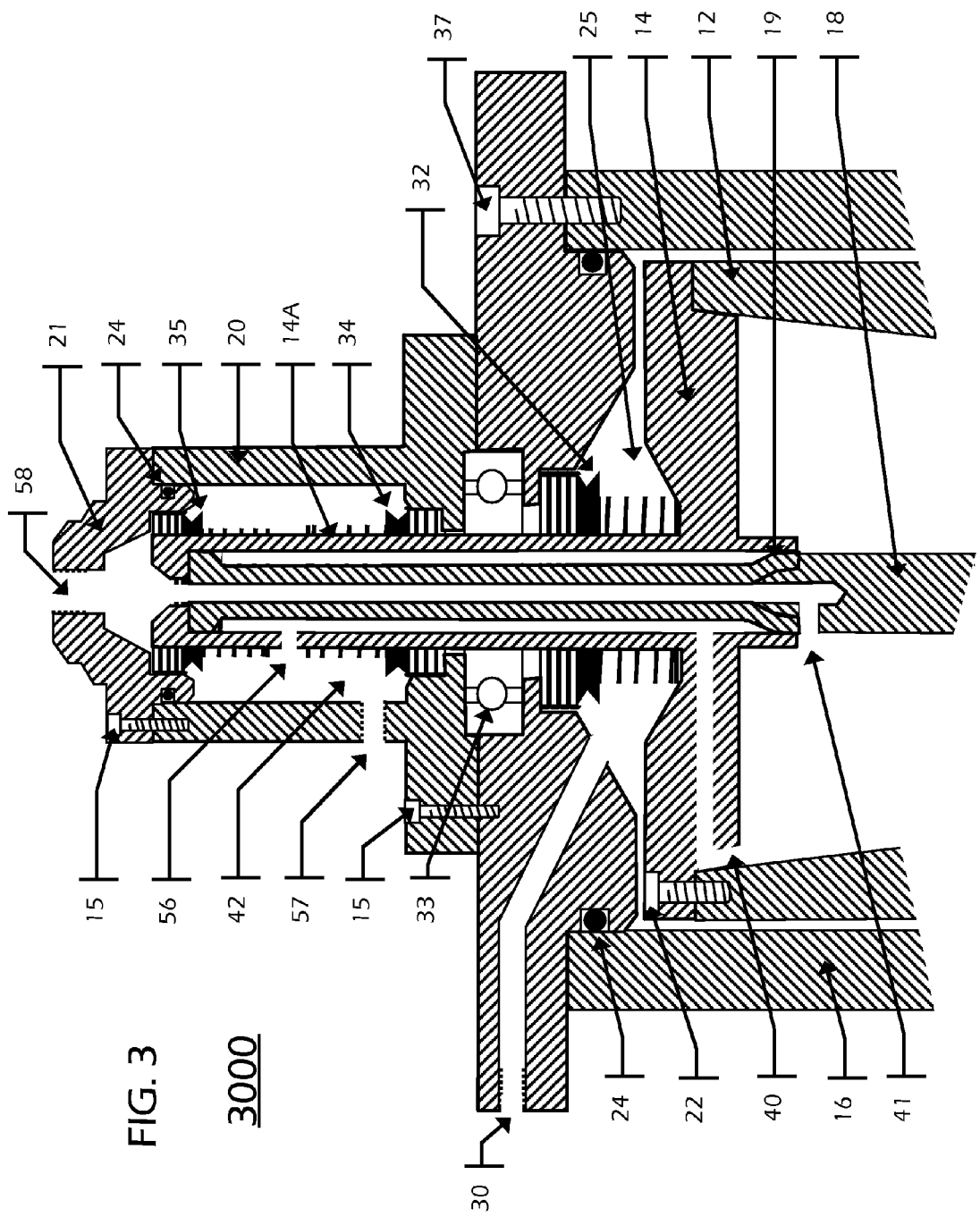
FIG. 3 is a detailed cross-sectional view of an exemplary embodiment 3000 of a bearing/seal arrangement.

A fluid inlet port 30 can be drilled and/or otherwise formed in the upper casing cap 39 (see, e.g., FIG. 1) and/or in the casing 16, and/or can allow one or more fluids to be heated, mixed, and/or reacted to enter device 10 first by entering a chamber or void 25 and/or directly into the clearance space 28 located between rotor 12 and casing 16. Mechanical seal 32 can prevent and/or minimize leakage of fluid adjacent to shaft 14A from the device. Mechanical seal 32 can be a spring-loaded seal and/or can be formed of tungsten carbide and/or other suitable material. Fluid that enters through upper casing cap 39 then can flow from the chamber 25 through the annular clearance 28 as rotor 12 rotates within casing 16 where rotation of rotor 12 with respect to cylindrical surface 26 with irregularities 27 can impart energy to the fluid. Upon achieving the desired result in the reaction/contact zone 28 from mixing and/or reacting, the fluid can pass through rotor inlet port 53 and/or can enter into the separation zone 29 of the rotor 12. Once in the rotor 12, the fluid can begin to separate into at least two phases, a heavy phase and/or a light phase, while traveling in an upward direction. G-rod 18 at the center of the rotor 12 can prevent fluid from short-circuiting through the center of the rotor 12, thereby forcing all fluid to be exposed to the G-forces developed by the spinning action of the rotor 12. One or more ports 40 for the heavy phase can be formed as desired with their diameter optimized to accommodate various fluids in the upper rotor hub 14 and/or one or more light phase ports 41 can be formed in the G-rod 18 for the conduction of the respective fluids to the seal body 20 where a heavy phase chamber 42 can be defined that can communicate with outlet port 57. Outlet port 58 can conduct light phase port 41 through G-rod 18 then thru I-port 19. Referring to FIG. 3, mechanical seals 34 and 35 can keep heavy phase and/or light phase fluids recombining and/or can allow for the device 10 to be operated at pressures from approximately 0 psig to approximately 100 PSIG. Bearing 33 can stabilize shaft 14A.

Machine 10 can operate at a rotational velocities of from approximately 400 rpm to approximately 5000 rpm, including all values and subranges therebetween. A motor speed of approximately 4000 rpm has been found to be an acceptable rotational velocity for rotors ranging from approximately 6.4 inches to approximately 8 inches in diameter. Because a 6.4 inch diameter rotor has a circumference of approximately 1.68 feet, if spun at approximately 4000 RPM, a point on this circumference will travel approximately 6720 feet in one minute, or approximately 112 feet per second. Because an 8.0 inch diameter rotor has a circumference of approximately 2.1 feet, if spun at approximately 4000 RPM, a point on this circumference will travel approximately 8400 feet in one minute, or approximately 140 feet per second, which can be faster than necessary to achieve the desired effect, such as a cavitational effect. Varying the rotational speed can vary the intensity of the cavitation produced and/or the energy delivered to the fluid. Certain exemplary embodiments can be driven comfortably using a motor rated at and/or that delivers approximately 5 horsepower to approximately 60 horsepower, including all values and subranges therebetween, such as approximately 7.5 horsepower.

The exemplary embodiment shown in FIGS. 1 and 2 has been operated at approximately 4250 rpm using an inlet pressure of approximately 70 pounds per square inch gauge. Exit temperature at that pressure, with a flow rate of approximately 1500 ml per minute was approximately 85 degrees C. The device shown in FIGS. 1 and 2 was supplied using metering pumps to deliver fluids at the inlet port 30. Referring to FIG. 5, the metering pumps at the inlet port 30 can be set as desired, and the exit fluid temperature can be increased by reducing the pressure of valve 63 at the exhaust port 58 and/or by increasing the rotational velocity of rotor 12. Exit pressure can be maintained slightly below inlet pressure; otherwise, temperature can increases and/or rotor 12 can spin at increased speeds as flow of fluids in void 28 apparently becomes nearer to laminar.

FIG. 2 shows an exemplary embodiment of a device 10', which can feature, within a casing 16', a rotor 12' having a reduced diameter midway down its surface 26', a beveled surface 61 where the transition to a reduced diameter of the rotor can occur, and/or a sleeve 59 that can be supported on brackets 60 from the surface of the casing 16'. Annular space 62 can be defined by the outer surface of the rotor 26' and the inner surface of sleeve 59 and/or can extend the length of rotor 12' from just below the rotor bevel 61. Casing caps 38 and 39 can be connected to casing 16' in a sealing relationship to form the remaining enclosure of casing 16'. Casing caps 38 and 39 can feature an axial bore sufficient in diameter to accommodate shafts 14A and 17A, seals 32 and 52, and/or bearings 33, 47A, and/or 47B. A second inlet port 30A can be provided midway down the length of casing 16' for introduction of a second dose of solvent and/or reactant as needed by the process being conducted. This embodiment can accommodate the partial separation of product and/or byproduct heavy phase fluid produced in the first stage reaction zone 46. By providing an annular space 62 in the second stage reaction zone 71 behind which the heavy phase can be separated from any reaction and/or mixing that can be induced in the second stage reaction zone 71. Cavities 27' can be provided to induce cavitation in the remaining fluid in the reaction zone 28' created by sleeve 59.

Figure 4:
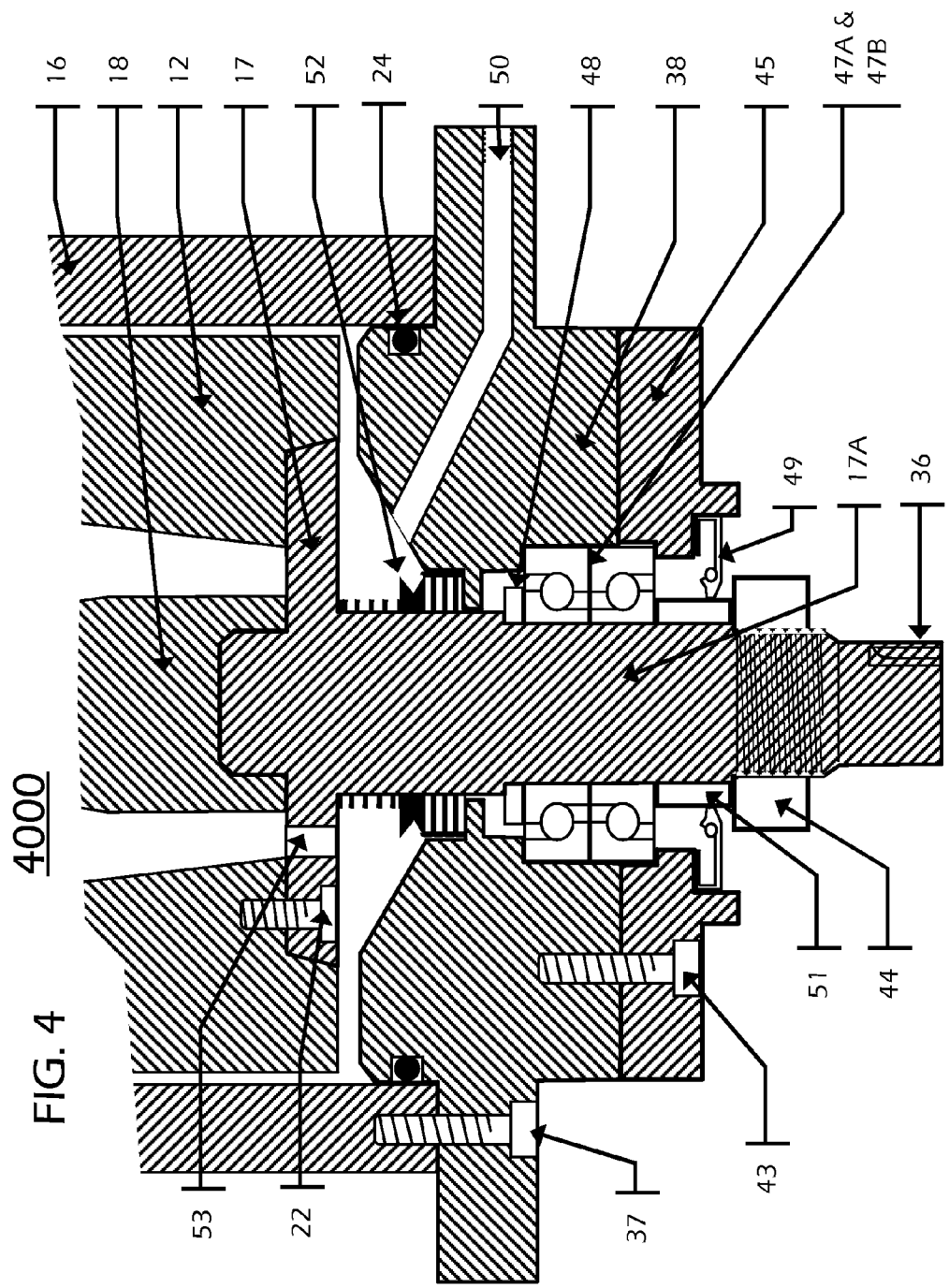
FIG. 4 is a detailed cross-sectional view of an exemplary embodiment 4000 of a bearing/seal arrangement.

FIG. 3 is a detailed cross-sectional view of an exemplary embodiment 3000 of a bearing/seal arrangement, such as that shown in the top portion of FIG. 1, and FIG. 4 is a detailed cross-sectional view of an exemplary embodiment 4000 of a bearing/seal arrangement, such as that shown in the bottom portion of FIG. 1. In these figures, elements that are the same as in FIG. 1 carry the same identifying numerals. Elements that are new are identified with new numerals. Mechanical seals 34 and 35 can keep heavy phase and light phase fluids from recombining and/or can allow for machine 10 to be operated at pressures ranging from approximately atmospheric to approximately 100 PSIG. Mechanical seals 34 and/or 35 can be spring-loaded seals and/or can be formed of tungsten carbide and/or other suitable material. Other seals and O-rings can be used as required.

In an implemented embodiment, the following store-bought parts were used for certain elements illustrated in FIGS. 3 and 4:

FIG. 3 #34 & #35—Light and Heavy Phase Pump Seals (2) Type 21 S682V
FIG. 3 #33—Upper Shaft Bearing JEM Bearing 6208
FIG. 3 #24—Upper Casing Viton O-Ring Dash-362
FIG. 3 #32—Upper Shaft Pump Seal Type 21 S238V
FIG. 4 #52—Lower Shaft Pump Seal Type 21 S682V
FIG. 4 #24—Lower Casing Viton O-Ring Dash-362
FIG. 4 #47A & B—Lower Shaft Angular Contact Bearings (2) Consolodated 7307BG
FIG. 4 #49—Oil Seal Lip Type NAPA 17778
FIG. 4 #44—Lock Nut Whittet-Higgins 1.376-18

FIG. 5 shows a schematic of an exemplary embodiment of a system 5000 that can include a device 10 as shown in FIG. 8. Fluids 1, 2, and 3 can be delivered under pressure to inlet port 30 and/or 30A by pumps 65 through check valves 66. External spiral wound heat exchangers 72 can deliver heat to and/or remove heat from device 10 as required by the process desired. Drive motor 68 can deliver the energy necessary for the reaction and/or separation of products and/or by-products that exit ports 57 and 58. Light phase fluid can exit device 10 at threaded port 58 and/or can be piped to back pressure regulating valve 63 then on to any further process as desired. Heavy phase fluid can exit device 10 through threaded port 57 and/or can be piped to back pressure regulating valve 64. Valve 64 can be provided with a spring loaded diaphragm and/or a dome load feature fed by pipe 55 that can have the ability to control device's 10 internal differential pressure. Before and/or after further desired processing, the respective fluids can be stored in tanks 67 and/or 67A. At shutdown and/or when in need of service, drain valve 70 threaded into port 50 can be opened to substantially completely empty device 10 of any fluid.

Figure 6:
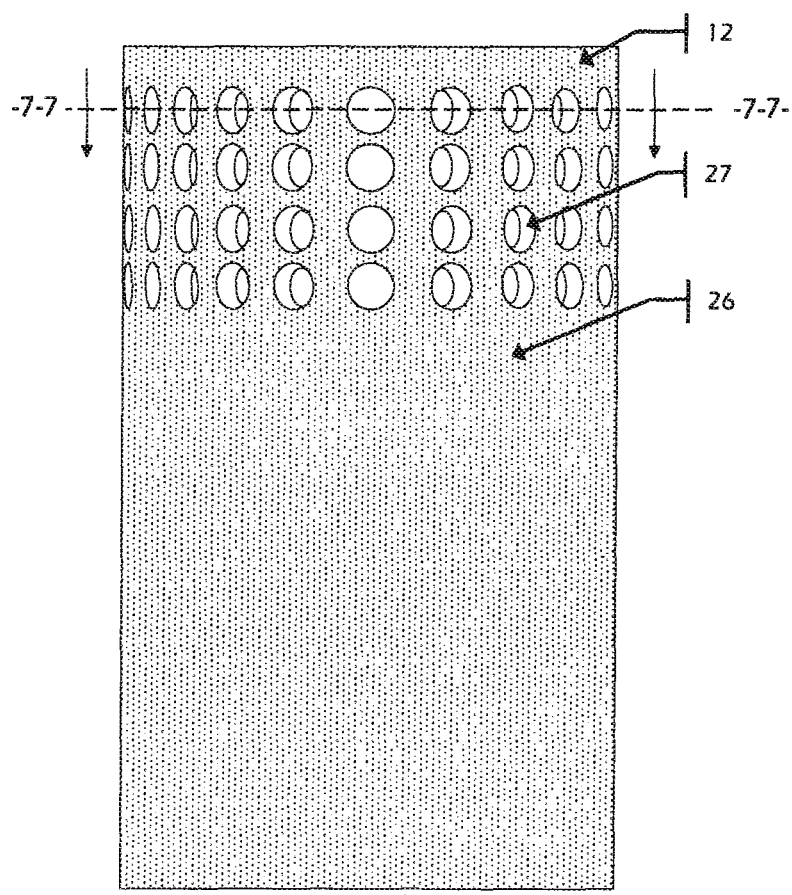
FIG. 6 shows an exemplary embodiment 6000 of a rotor.

FIG. 6 shows an exemplary embodiment 6000 of a rotor 12, such as of device 10 of FIG. 1. Bore holes 27 can be drilled or otherwise formed into the surface 26 of rotor 12.

Figure 7:
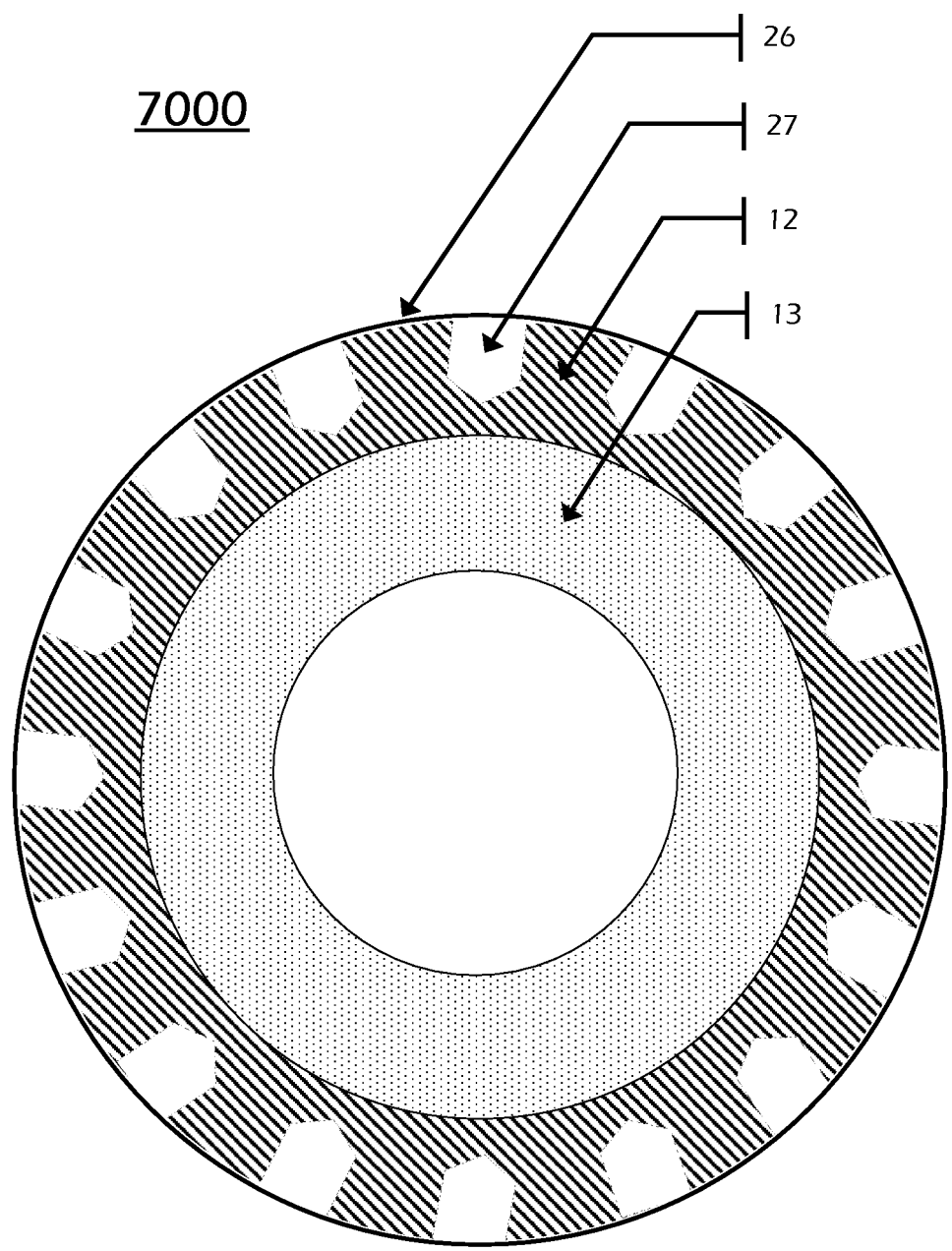
FIG. 7 shows an exemplary embodiment 7000 of a cross section of a rotor taken at section line 7-7 of FIG. 6.

FIG. 7 shows an exemplary embodiment 7000 of a cross section of a rotor taken at section line 7-7 of FIG. 6. Inner surface 13 of rotor 12 can be beveled at an angle of approximately 3 degrees to approximately 7 degrees, including all values and subranges therebetween, such as approximately 5 degrees in relation to the axis of rotor 12. Bore holes 27 can be drilled and/or otherwise formed into the surface 26 of rotor 12. The depth and/or diameter of bore holes 27 can be adjusted in dimension and/or orientation to optimize the effectiveness for the intended process.

FIG. 8 shows in perspective view an exemplary embodiment of a system 8000, in which fluids can be delivered under pressure to inlet port 30 of device 10. Drive motor 68 can deliver the energy necessary for the reaction and/or separation of products and/or by-products that can exit ports 57 and/or 58. Light phase fluid can exit device 10 at threaded port 58 and/or can be piped to back pressure regulating valve 63 then on to any further desired processing. Heavy phase fluid can exit device 10 through threaded port 57 and/or can be piped to back pressure regulating valve 64. Valve 64 can be provided with a spring loaded diaphragm and/or a dome load feature fed by pipe 55 that can have the ability to control the internal differential pressure of device 10. At shutdown and/or when in need of service, drain valve 70 threaded into port 50 can be opened to substantially completely empty device 10 of any fluid. The entire device 10 can be supported by a stand 69 and/or as appropriate.

Figure 9:
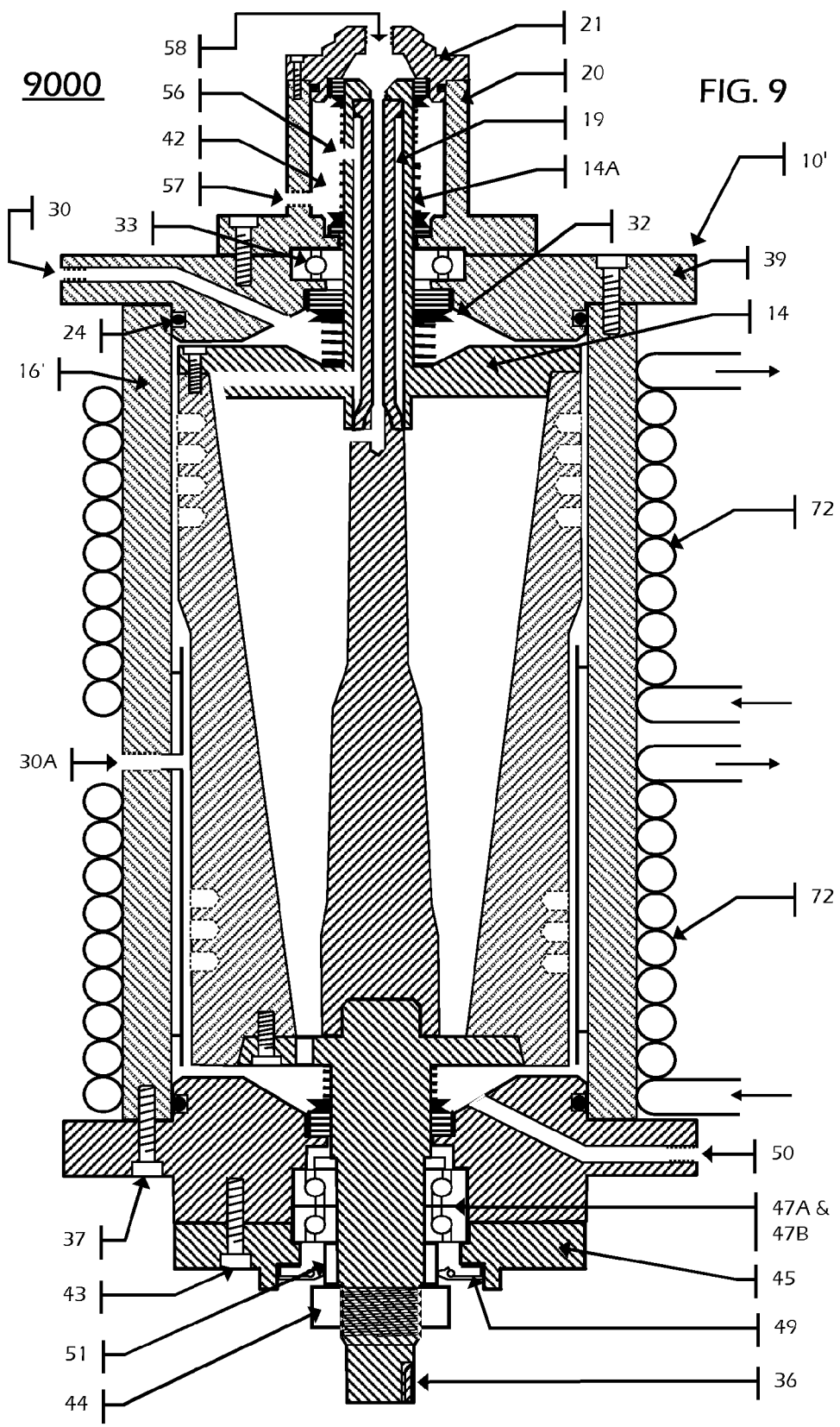
FIG. 9 is a cross-sectional view of exemplary embodiment 9000 of a machine taken at section line 9-9 of FIG. 8.

FIG. 9 is a cross-sectional view of exemplary embodiment 9000 of a machine and/or device 10' taken at section line 9-9 of FIG. 8. In FIG. 9, elements that are the same as in FIG. 2 carry the same identifying numerals. Elements that are new are identified with new numerals. Device 10' can feature the addition of two spiral wound heat exchangers 72 to the outside surface of the casing 16'. Spiral wound heat exchangers are shown as representative only and any configuration can be used that accomplishes the desired effect. Heat exchangers 72 can be machined into casing 16' and/or formed in another way. Heat exchangers 72 can be connected together and/or remain independent of each other as is desired. Heat exchangers 72 can be used to add and/or remove heat from the process being conducted in device 10' as desired.

As described above, FIG. 10 is an exemplary block flow diagram for an exemplary biodiesel process 10000.

Figure 11:
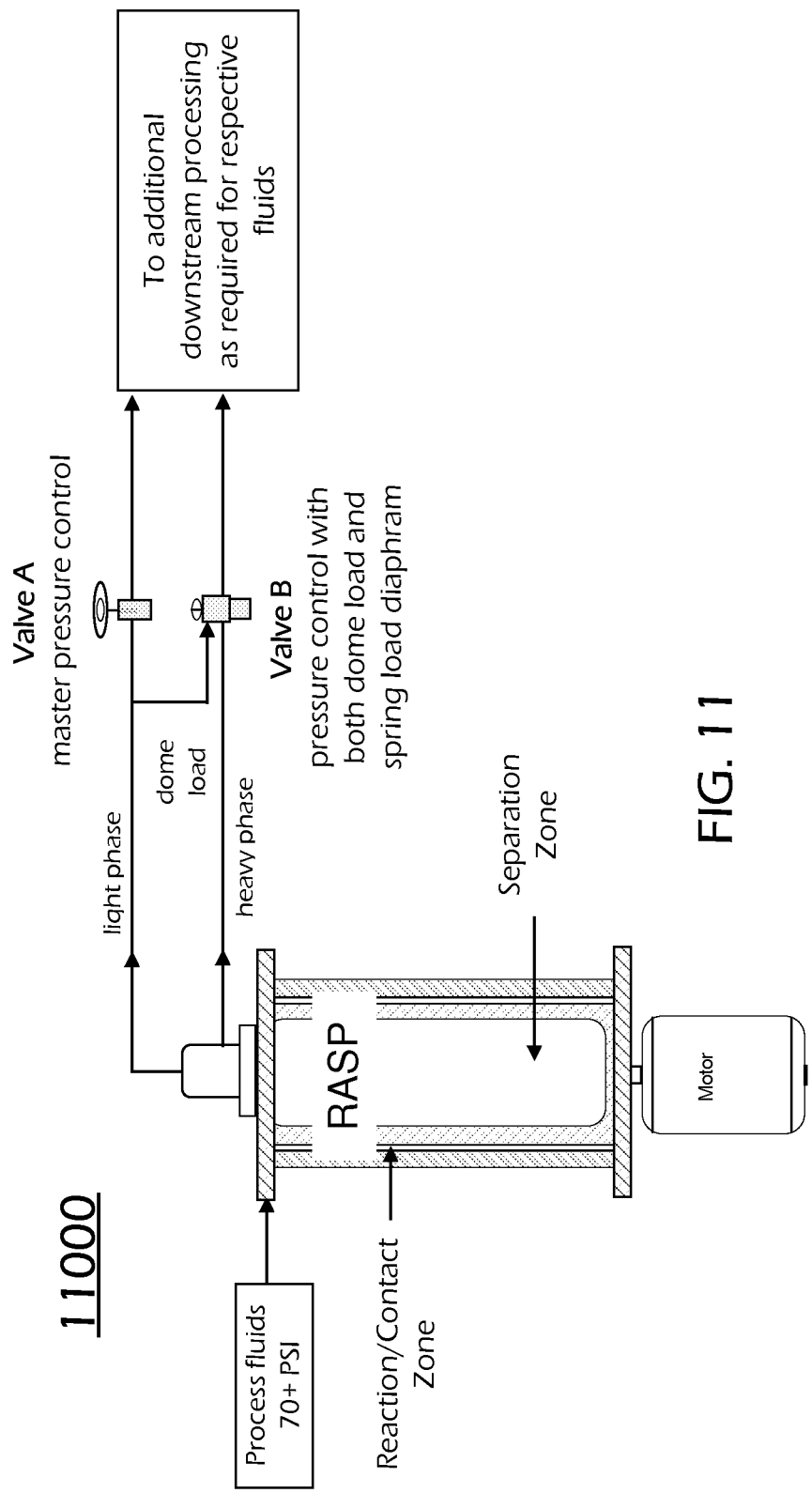
FIG. 11 is a schematic view of an exemplary embodiment of a system 11000.

FIG. 11 is a schematic view of an exemplary embodiment of a system 11000. As shown, two fluids of differing specific gravity can be separated in the Separation Zone of the RASP. The centrifuge can be operated at approximately 100 degrees C. and/or approximately 70 PSIG. The separated fluids can exit the centrifuge through mechanical seals located at the top of the unit. Valves A & B can control the pressure of the exiting fluids and/or can maintain the correct minimum back pressure of approximately 70 PSI. Operating at steady state, a differential pressure can develop between the light and heavy phase exit ports of approximately 8 PSI. It can be desirable to control the exiting fluids to prevent a breakthrough of light phase into the heavy phase or vice-versa and/or to correct for any process drift or upset. In certain exemplary embodiments, Valve "A" can be set to control the system master pressure while valve "B" can be set to control the desired differential pressure. In this manner, the wall, line, and/or area of separation internal to the RASP separation zone (e.g., the phase boundary) can be maintained automatically and/or adjustments to accommodate a change in operating parameters can be made without shutting down the process and/or disassembling the RASP.

Thus, certain exemplary embodiments can provide a control device, valve arrangement, module, and/or scheme that can:
  eliminate the use of traditional, physically solid, internal weirs (partitions) to control the phase boundary inside the device;
  provide an effective, hydraulic, and/or pneumatic weir that can automatically adjust and/or vary its effective "height" and/or the phase boundary while the process and/or machine are running;
  be unaffected by the changing ratio of feed;

deliver product and/or by-product under pressure to the next stage of processing;

process materials above their vaporization temperature;

separate products from a reaction immediately, thereby preventing the reversal of the reaction; and/or provide for very little material in process at any moment.

With respect to the inner surface of the casing and the outer surface of the rotor, in certain exemplary embodiments described herein, shear can be optimized by both surfaces being smooth and/or polished and/or the two surfaces being very closely spaced in relation to the density and/or surface tension of the fluid. Generated shear forces can heat fluids due to friction in the fluids. Compared to cavitation, shear can be an inefficient way to heat and/or mix a fluid because shear can require a higher energy input to develop equivalent temperature and/or work.

Turbulence can be induced when there is a surface irregularity that will prevent laminar flow. This surface irregularity can be an indentation and/or protrusion on the surface of either the rotor or the casing. The best place to put the irregularity can be on the rotor. Turbulence might be desirable if the machine were used for only a mixing/contacting process and it was not necessary and/or desirable to heat the fluid.

Hydrodynamic cavitation can occur if cavities are provided on the rotor. As the rotor spins through the flooded reaction zone, each cavity alternately can be filled and then emptied by the forces present. The cavities can be filled because of a low pressure developed at the lip of the cavity as it moves through the fluid, which can pull fluid into the cavity. But, also present and opposing the flooding of the cavity can be centrifugal forces developed by the same angular rotation of the rotor. This force can throw the fluid out of the cavity, thereby forming a tiny empty bubble. Such a bubble likely would not being formed from pressure within it (like a bubble you would blow) but instead likely would be formed from the energy imparted to the fluid through the angular velocity, which can tend to tear apart the fluid. Thus, this bubble can have a vacuum inside. The bubble can grow to a size that is in relation to the pressure of the system, the surface tension of the fluid, and/or the energy imparted by the angular velocity. The bubble then can collapse into itself. This collapsing can produce great temperature at the focus and can be facilitated by the size and/or shape of the cavity. The bottom surface of the cavity can be shaped into a cone (just like an ordinary drill bit leaves when drilling a hole into a hard material). This apex in the bottom of the hole can cause the fluid to "jet" out of and/or into the cavity at extremely high velocity and actually slam the molecules of fluid into one another. The collapse of such cavities and/or cavitation has been reported to have produced temperatures at the focal point of the cavity in the neighborhood of 5,000 degrees F.

In the separation zone, any of several parameters can be considered to optimize performance for a specific process. These parameters can include droplet diameter, viscosity and/or density of the two liquid phases at the desired process temperature, total flow rate, and/or rotor speed.

How efficiently two fluids will separate in a centrifuge is sometimes described by Stokes Law:

$$V_c = \frac{d^2(\rho_H - \rho_L)}{18\eta_{avg}} \cdot r\omega^2$$

where: $V_c$=the centrifugal settling velocity d=the liquid droplet diameter $\rho_H$=the density of the heavy phase $\rho_L$=the density of the light phase r=the radial distance of liquid from the rotor axis $\omega$=the angular velocity (RPM of the rotor)

$\eta_{avg}$=the average viscosity of the processed fluids

The settling velocity, $V_c$, can be an important parameter in phase separation, as it can be a measure of how rapidly two immiscible phases will separate. From this equation, parameters that can result in the most efficient phase separation (largest $V_c$) can be predicted. Parameters that would increase $V_c$ can include: larger droplet size, increasing the density difference between two phases, higher angular velocity, and/or low viscosity. Conversely, less efficient phase separation can be expected in systems with: smaller droplet size, small density differences, lower angular velocity, and/or more viscous fluids. Parameters that the operator often can readily control when optimizing the RASP equipment can include angular velocity and/or fluid residence time while in the rotor, which can be directly controlled by feed rate. Lowering the feed rate can improve the quality of one and/or both separated phases by allowing more time to achieve efficient separation.

Thus, certain exemplary embodiments can provide:

reaction and/or separation in one device, at elevated (above atmospheric) pressures, thus allowing processing of materials above their temperature/vaporization curve point;

a self-cleaning rotor that can tend to avoid buildup of particulate material on the rotor's inner surface, which could otherwise cause the machine to be shut down for maintenance due to sludge build-up and the subsequent harmonic vibration; and/or a continuous flow process that can allow for an automated system that can monitor inputs and/or outputs to assure product consistency and/or lower unit costs of production.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that issues herefrom and/or claims priority hereto, each definition (or redefined term if an original definition was amended during the prosecution of that patent), functions as a clear and unambiguous disavowal of the subject matter outside of that definition.

a—at least one.

about—around.

accept—to receive.

activity—an action, act, step, and/or process or portion thereof.

adapted to—suitable, fit, and/or capable of performing a specified function.

alcohol—any of a class of chemical compounds having the general formula ROH, where R represents an alkyl group and OH a hydroxyl group, as in methyl alcohol, $CH_3OH$, or ethyl alcohol, $C_2H_5OH$.

and/or—either in conjunction with or in alternative to.

annular—shaped like a ring.

apparatus—an appliance or device for a particular purpose approximately—about and/or nearly the same as.

at least—not less than.

atmospheric pressure—the pressure exerted by the earth's atmosphere at any given point, being the product of the mass of the atmospheric column of the unit area above the given point and of the gravitational acceleration at the given point; typically approximately 14.7 psia.

between—in a separating interval and/or intermediate to.

biodiesel—a methyl or ethyl ester made from vegetable oils and/or animal fats; most commonly blended with and/or used in place of diesel fuel for use in compression-ignition (diesel) engines.

byproduct—a secondary or incidental product.

can—is capable of, in at least some embodiments.

casing—an enclosure that is typically generally cylindrical.

cause—to bring about, provoke, precipitate, produce, elicit, be the reason for, result in, and/or effect.

cavity—a hollow area, such as a hole, bore, etc., within an object.

centrifugally—characterized by moving or directed outward from the center.

comprises—includes, but is not limited to, what follows.

comprising—including but not limited to, what follows.

conduct—to act as a medium for conveying something such as heat and/or electricity.

conduction—a process and/or state of acting as a medium for conveying something such as heat and/or electricity.

connect—to join or fasten together.

contain—to restrain, hold, and/or keep within limits.

continuous—in a manner substantially uninterrupted in time, sequence, substance, and/or extent, and/or substantially without cessation.

control—(n) a mechanical or electronic device used to operate a machine within predetermined limits; (v) to exercise authoritative and/or dominating influence over, cause to act in a predetermined manner, direct, adjust to a requirement, and/or regulate.

couple—to join, connect, and/or link two things together.

coupleable—capable of being joined, connected, and/or linked together.

create—to make, form, produce, generate, bring into being, and/or cause to exist.

cylindrical—of, relating to, and/or having the shape of a cylinder, especially of a circular cylinder.

define—to establish the meaning, relationship, outline, form, and/or structure of; and/or to precisely and/or distinctly describe and/or specify.

device—a machine, manufacture, and/or collection thereof.

during—at some time in a time interval.

emulsify—to form a suspension of tiny droplets of one liquid in a second liquid. By making an emulsion, one can mix two liquids that ordinarily do not mix well, such as oil and water.

external—exterior and/or relating to, existing on, and/or connected with the outside and/or or an outer part.

fatty acid methyl ester (FAME) —a substance that can be created by an alkali catalyzed reaction between fats or fatty acids and methanol. The molecules in biodiesel are primarily FAMEs, usually obtained from vegetable oils by transesterification.

feed—to introduce and/or cause to flow toward and/or into.

fit—adapted to be of the right size and/or shape for; adapted to conform to a shape of flash evaporation column—a device adapted to cause vaporization of at least one liquid via reducing a pressure of that liquid below its vaporization pressure for that liquid's current temperature.

fluid—a liquid, slurry, vapor, mist, cloud, plume, and/or foam, etc.

formation—the state, process, and/or act of creating, making, constructing, and/or generating.

from—used to indicate a source.

further—in addition.

glycerol—a chemical compound, with the formula $HOCH_2CH(OH)CH_2OH$, commonly called glycerin or glycerine, that is: a colorless, odorless, sweet-tasting, viscous, liquid sugar alcohol of low toxicity, a central component of lipids, widely used in pharmaceutical formulations, and that has three hydrophilic alcoholic hydroxyl groups that are responsible for its solubility in water and its hygroscopic nature.

heat—energy associated with the motion of atoms and/or molecules and capable of being transmitted through solid and fluid media by conduction, through fluid media by convection, and through a fluid and/or empty space by radiation.

heat exchanger—a device used to transfer heat from a first fluid on one side of a barrier to a second fluid on the other side without bringing the first fluid and the second fluid into direct contact with each other.

impurities—contaminants and/or undesired substances.

induce—to bring about and/or cause to occur.

inner—closer than another to the center and/or middle.

install—to connect or set in position and prepare for use.

interaction—the state and/or process of acting upon one another.

into—toward, in the direction of, and/or to the inside of irregularity—a discontinuity and/or other deviation in contour and/or texture.

located—situated in a particular spot and/or position.

longitudinal axis—a straight line defined parallel to an object's length and passing through a centroid of the object.

machine—a device and/or vehicle adapted to perform at least one task.

may—is allowed and/or permitted to, in at least some embodiments.

metallic—comprising a metal.

method—a process, procedure, and/or collection of related activities for accomplishing something.

methoxide—an organic salt that is the smallest alkoxide, has a formula of $CH_3O^-$, and is the conjugate base of methanol.

mix—to combine, blend, and/or add one substance with another to form one mass and/or mixture.

operational parameter—of or pertaining to a sensed, measured, and/or calculated variable related to a utilization of a process and/or machine.

outer—farther than another from the center and/or middle.

partition—something, such as a wall or barrier, that separates and/or divides.

plurality—the state of being plural and/or more than one.

predetermined—established in advance.

preheat—to heat prior to introducing reactants into.

pressure—a measure of force applied uniformly over a surface.

protrusion—something that protrudes and/or projects from an object and/or a surface.

radially—in a manner that radiates from and/or converges to a common center.

reaction—a chemical change and/or a change and/or transformation in which a substance decomposes, combines with other substances, and/or interchanges constituents with other substances.

regulate—to control, direct, and/or adjust according to a particular specification and/or requirement.

remove—eliminate and/or to separate from.
repeatedly—again and again; repetitively.
revolutions per minute—a number of complete rotations about an axis during a time period of one minute.
rotate—to turn about an axis.
rotation—an act and/or process of turning around a center and/or an axis.
rotor—a rotating portion of a machine.
said—when used in a system or device claim, an article indicating a subsequent claim term that has been previously introduced.
self-cleaning—adapted to substantially rid itself of reactants, product, by-products, contaminants, and/or residue.
separate—(n) distinct; (v) to disunite, space, set, or keep apart and/or to be positioned intermediate to.
separation—a spacing apart, disunification, and/or a act or instance of separating or the state of being separated.
set—a related plurality.
shaft—a long, generally cylindrical bar that is adapted to rotate about a longitudinal axis and to transmit power.
single—existing alone or consisting of one entity.
sleeve—an annular member and/or part.
space—a gap.
speed—a linear, curvilinear, and/or angular velocity and/or a linear, curvilinear, and/or angular distance traveled during a predetermined time interval.
stationary—not moving relative to something else.
strip—to substantially remove and/or separate from.
substantially—to a considerable, large, and/or great, but not necessarily whole and/or entire, extent and/or degree.
sufficiently—to a degree necessary to achieve a predetermined result.
support—to bear the weight of, especially from below.
surface—the outer boundary of an object or a material layer constituting or resembling such a boundary.
system—a collection of mechanisms, devices, machines, articles of manufacture, processes, data, and/or instructions, the collection designed to perform one or more specific functions.
therebetween—in an interval separating a first thing from a second thing.
through—in one side and out the opposite or another side of, across, among, and/or between.
transfer—to convey and/or cause to flow from one location to another.
triglyceride—an ester obtained from glycerol by the esterification of three hydroxyl groups with fatty acids, naturally occurring in animal and vegetable tissues.
upon—on occasion of, during, when, and/or while.
valve—a device that regulates flow through a pipe and/or through an aperture by opening, closing, and/or obstructing a port and/or passageway.
vegetable oil—any of numerous plant substances and/or fats that are generally: slippery, combustible, viscous, liquid, and/or liquefiable at room temperatures; soluble in various organic solvents such as ether but typically not in water; and/or used as a lubricant.
via—by way of and/or utilizing.
virgin—substantially pure.
wherein—in regard to which; and; and/or in addition to.
within—inside.
zone—a volume and/or region.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A reaction and separation processor, comprising:
   a stationary casing having a sealed upper end and a sealed lower end;
   a rotor having a sealed upper end and a sealed lower end, with the rotor being internal to the casing and in connection with an upper shaft at the upper end of the rotor, and with a gap formed between the rotor and casing, wherein the rotor is rotatable within the casing;
   fluid inlet port at the upper end of the casing for delivering fluid to a reaction zone of the processor, in which the reaction zone is defined as the gap between an upper portion of the rotor and casing, with surface irregularities for inducing fluid turbulence in the reaction zone being located on an inner surface of the casing, an outer surface of the rotor, or both;

a rotor inlet port at a lower end of the rotor for directing fluid from the reaction zone into a separation zone within the rotor;

a heavy phase port at the upper end of the rotor for directing a heavy phase of the fluid from the separation zone to a heavy phase outlet port located at the upper end of the casing; and a light phase port at the upper end of the rotor for directing a light phase of the fluid from the separation zone through the upper shaft and to a light phase outlet port at the upper end of the casing.

2. The reaction and separation processor of claim 1, wherein the surface irregularities are comprised of cavities in the outer surface of the rotor.

3. The reaction and separation processor of claim 1, wherein the inner surface of said casing is smooth.

4. The reaction and separation processor of claim 1, further comprising a heat exchanger fitted to an outer surface of the casing.

5. The reaction and separation processor of claim 1, further comprising a valve for regulating pressure of at least one of the heavy phase outlet port and the light phase outlet port.

6. The reaction and separation processor of claim 1, further comprising a sleeve arranged between the gap formed between the rotor and casing for inducing cavitation in the reaction zone.

7. The reaction and separation processor of claim 1, further comprising a heavy phase chamber in connection with the upper shaft and in an arrangement in which the heavy phase of the fluid is directed through the heavy phase port, through the shaft, into the heavy phase chamber and to the heavy phase outlet port.

8. The reaction and separation processor of claim 1, further comprising a rod internal to the rotor.

9. The reaction and separation processor of claim 8, wherein the light phase port is in connection with the rod and shaft in a manner in which the light phase of the fluid is directed from the separation zone through the rod and shaft and to the light phase outlet port.

10. The reaction and separation processor of claim 1, further comprising a lower shaft in connection with a lower end of the rotor.

11. A process for producing biodiesel, comprising the steps of:

delivering fluid to a fluid inlet port at an upper end of a stationary casing of a processor having a reaction zone and a separation zone, wherein the casing has a sealed upper end and a sealed lower end, and the fluid is comprised of i) vegetable oils, animal fats, or both, and ii) alcohol, methoxide, or both;

directing the fluid delivered to the fluid inlet port to the reaction zone of the processor, wherein the reaction zone is defined as a gap between the casing and a rotor internal to the casing, with the rotor having a sealed upper end and a sealed lower end;

inducing turbulence in the reaction zone through rotation of the rotor and surface irregularities being located on an inner surface of the casing, an outer surface of the rotor, or both;

directing the fluid from the reaction zone through a rotor inlet port at a lower end of the rotor and into the separation zone located within the rotor;

directing a heavy phase of the fluid from the separation zone through a heavy phase port at the upper end of the rotor to a heavy phase outlet port located at the upper end of the casing, wherein the heavy phase comprises glycerol; and directing a light phase of the fluid from the separation zone through a light phase port at the upper end of the rotor to a light phase outlet port at the upper end of the casing, wherein the light phase comprises the biodiesel.

12. The process of claim 11, wherein the surface irregularities are comprised of cavities in the outer surface of the rotor.

13. The process of claim 11, wherein the inner surface of said casing is smooth.

14. The process of claim 11, further comprising inducing cavitation in the reaction zone through a sleeve arranged between the gap formed between the rotor and casing.

15. The process of claim 11, further comprising directing the heavy phase of the fluid from the separation zone through the heavy phase port, through a shaft at the upper end of the rotor, into a heavy phase chamber in connection with the shaft and to the heavy phase outlet port.

16. The reaction and separation processor of claim 11, wherein the light phase of the fluid is directed from the separation zone through a rod internal to the rotor and to the light phase outlet port.

* * * * *